United States Patent [19]
Ester et al.

[11] Patent Number: 6,050,382
[45] Date of Patent: Apr. 18, 2000

[54] CLUTCH DISK FOR A MOTOR VEHICLE FRICTION CLUTCH

[75] Inventors: Barbara Ester, Schweinfurt; Helmuth Weissenberger, Theilheim; Achim Link, Schweinfurt, all of Germany

[73] Assignee: Mannesmann Sachs AG, Schweinfurt, Germany

[21] Appl. No.: 09/178,103

[22] Filed: Oct. 23, 1998

[30] Foreign Application Priority Data

Oct. 25, 1997 [DE] Germany .......................... 197 47 220

[51] Int. Cl.$^7$ .............. F16D 3/14; F16D 47/02; F16D 69/00
[52] U.S. Cl. ................. 192/213.1; 192/210; 192/210.1; 192/213.22
[58] Field of Search ................. 192/3.28, 3.29, 192/210, 203, 207, 210.1, 213.1, 213.22

[56] References Cited

U.S. PATENT DOCUMENTS 4,681,201  7/1987  Teramae et al. ..................... 192/106.2

FOREIGN PATENT DOCUMENTS

| | | | |
|---|---|---|---|
| 35 42 491 C2 | 3/1996 | Germany ......................... | F16D 13/64 |
| 2 183 787 | 6/1987 | United Kingdom .............. | F16D 3/14 |
| 2 183 790 | 6/1987 | United Kingdom .............. | F16D 3/14 |
| 2 251 052 | 6/1992 | United Kingdom .............. | F16D 3/14 |
| 2 292 784 | 3/1996 | United Kingdom .............. | F16D 3/14 |

*Primary Examiner*—Charles A. Marmor
*Assistant Examiner*—Tisha D. Waddell
*Attorney, Agent, or Firm*—Cohen, Pontani, Lieberman & Pavane

[57] ABSTRACT

A clutch disk having a load torsion oscillation damper and an idling torsion oscillation damper with friction device. At least a part of the idling friction device has an inner toothing for rotationally fixed and play-free engagement with an outer toothing of an inner hub which is designed to be extended in the axial direction with a reduced diameter.

18 Claims, 6 Drawing Sheets

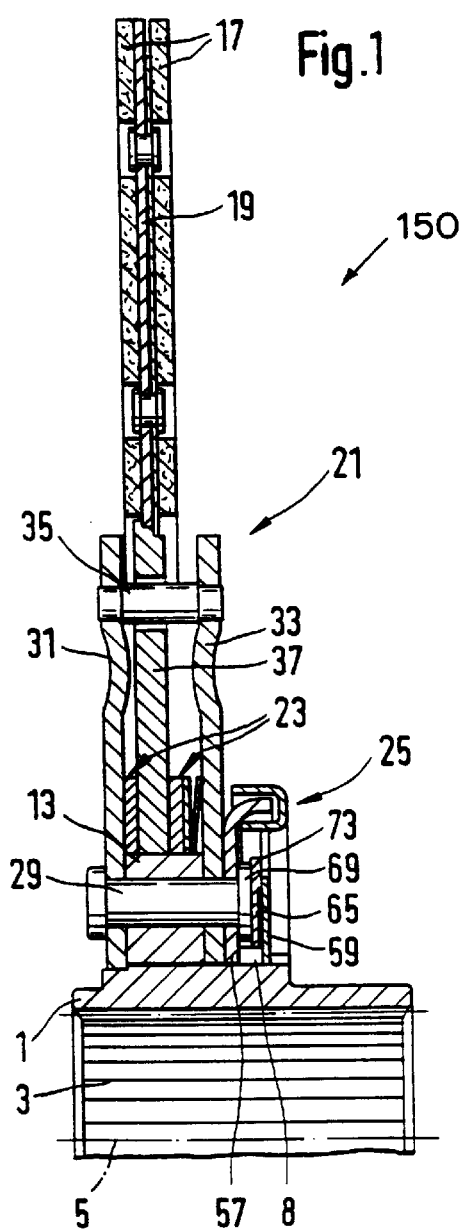
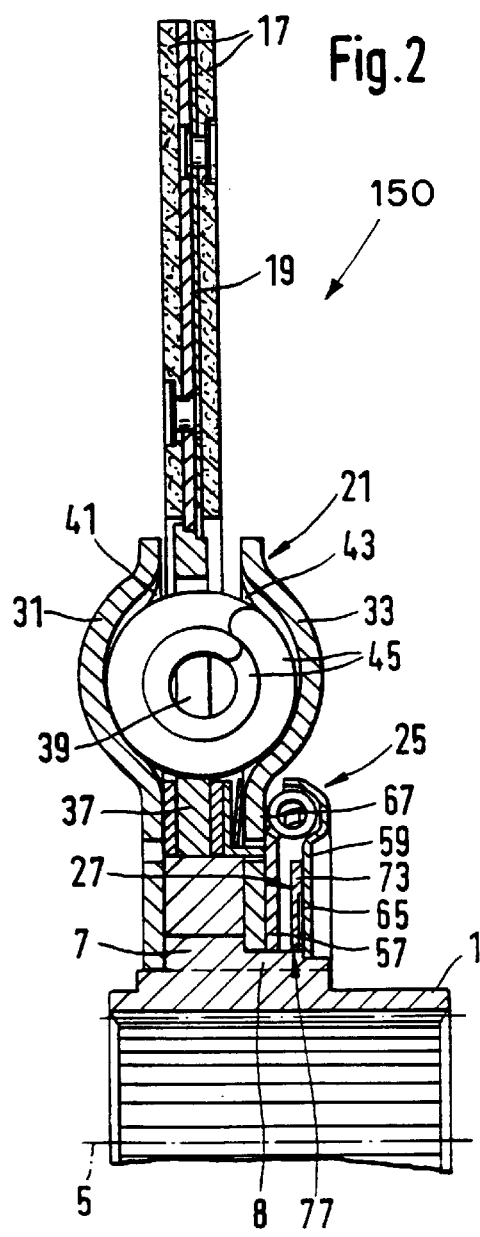
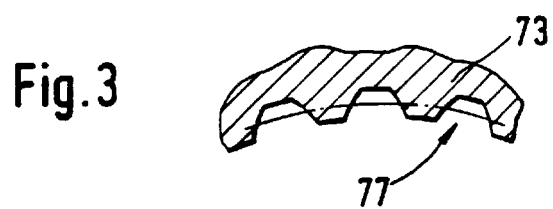

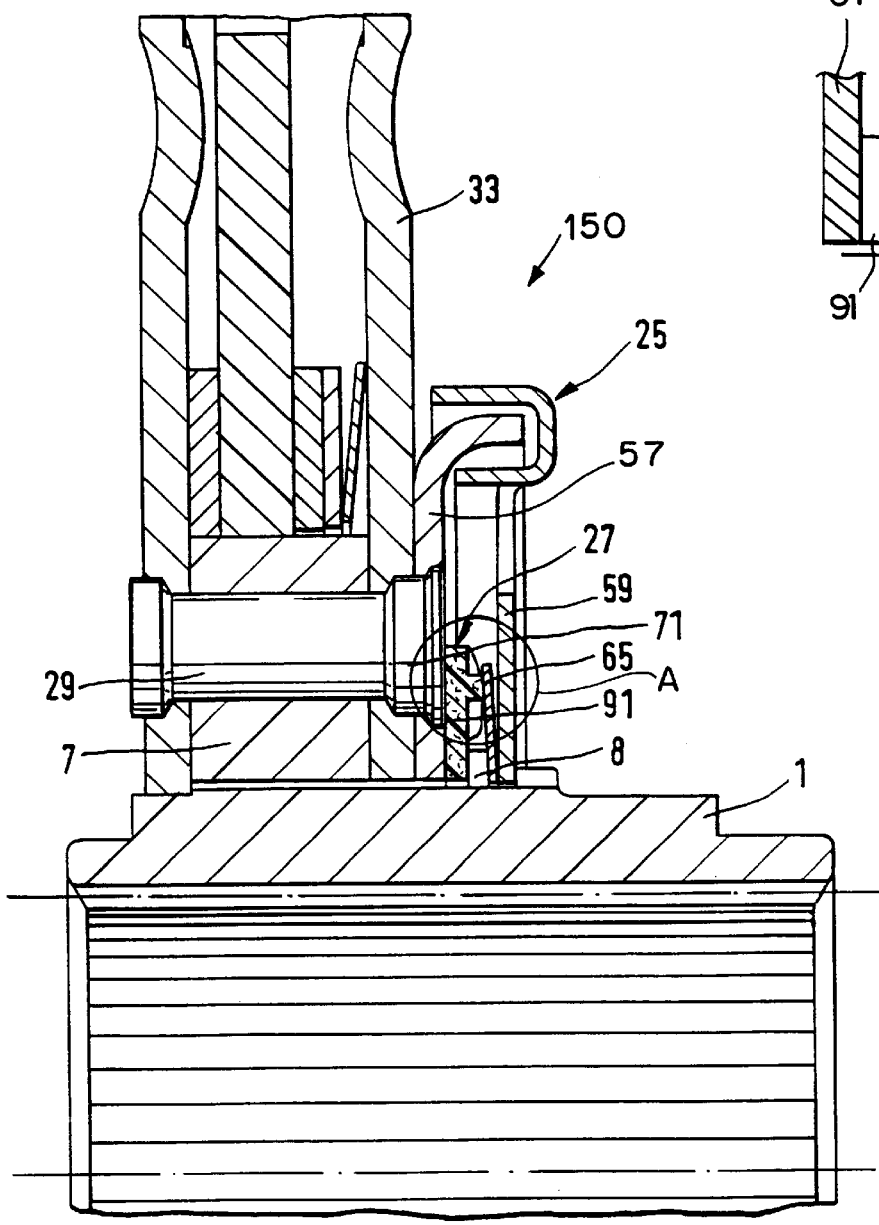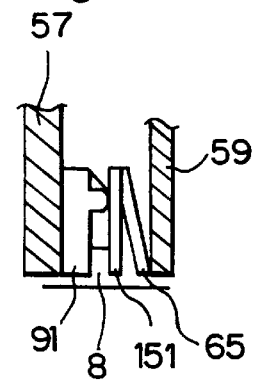

CLUTCH DISK FOR A MOTOR VEHICLE FRICTION CLUTCH

BACKGROUND OF THE INVENTION

1. Field of the Invention

The invention relates to a clutch disk for a motor vehicle friction clutch having an inner hub, an outer hub coupled to the inner hub with a predetermined amount of rotational play, an entrainer disk rotatable relative to the outer hub through a limited angle of rotation and having friction facings, a load torsion oscillation damper connected between the outer hub and the entrainer disk, and an idling torsion oscillation damper connected between the outer hub and the inner hub.

2. Description of the Related Art

A clutch disk having an inner hub, an outer hub, an entrainer disk, a load torsion oscillation damper connected between the outer hub and the entrainer disk, and an idling torsion oscillation damper connected between the outer hub and the inner hub is known from German Patent Specification 35 42 491. In this prior art design, the inner hub is provided, in the axial range of extent of the outer hub, with an outer toothing into which an inner toothing of the outer hub engages. The rotational play of this toothing determines the range of action of the idling torsion oscillation damper. At the same time, the parts of the load torsion oscillation damper are guided by the outer toothing of the inner hub in the axial direction A friction device of the idling torsion vibration damper of this prior art device is disposed in such a manner that the ring disk which is fixedly connected to the inner hub is acted upon by a force to operate the idling torsion damper.

SUMMARY OF THE INVENTION

It is the object of the present invention to accommodate the friction device for the idling torsion oscillation damper in space-saving fashion, and to keep an additional stressing of the annular disk of the idling damper as low as possible.

According to the invention, this object is achieved by a clutch disk for a friction clutch having an inner hub rotatably fixedly connected to an outer hub with a predetermined amount of rotational play, and an entrainer disk having clutch friction facings connected to the outer hub so that it is rotatable through a limited angle of rotation relative to the outer hub. A load torsion vibration damper connected between the outer hub and the entrainer disk includes a first part comprising two axially spaced lateral disks and a second part comprising an intermediate disk between the lateral disks. Springs are mounted between the first and second parts such that the first part is resiliently rotatably supported relative to the second part. An idling torsion vibration damper connected between the inner hub and the outer hub includes a first annular disk and a second annular disk rotatably resiliently supported against each other by idling springs. An idling friction device is arranged between the first and second annular disks radially within the idling springs. At least one part of the idling friction device has an inner toothing engaging an axial extension of the outer toothing of the inner hub for rotationally fixing the at least one part of the idling friction device.

As a result of the rotationally fixed arrangement of the at least one of the parts of the idling function device on the axially extended outer toothing of the inner hub, torsional stressing of the axially outer one of the annular disks of the idling torsion vibration damper by the idling friction device is prevented. Moreover, no component of the idling friction device is disposed on the outer side of the axially outer annular disk. Accordingly, this axially outer annular disk and its rotationally fixed connection to the inner hub is kept free from additional friction forces.

According to a further feature of the invention, it is advantageous that the at least one part of the idling friction device is an axially acting spring. With this design, a particularly simple friction device is constructed. The axially acting spring is designed at the same time as a rotationally fixed component with the inner hub and generates a friction force relative to the axially outer annular disk which is rotatable in relation thereto.

It is further proposed that both the axially outer annular disk of the idling torsion vibration damper and the spring are axially set at a ledge of the outer toothing of the inner hub and are secured together. Such a design is particularly advantageous with regard to assembly and production expenditure.

However, the at least one part may also comprise a friction ring which is urged by a spring toward the lateral disk adjacent to the idling torsion vibration damper. In this arrangement, the necessary friction force is adapted to a substantially greater extent and the spring may be interposed as a simple component, such as a corrugated spring or cup spring.

A further embodiment provides that the at least one part is a pressure disk axially disposed between a spring and a friction ring. The spring urges the pressure disk and the friction ring toward the lateral disk. In this embodiment, a very uniform surface stressing of the friction ring is guaranteed, since the pressure disk rests flatly on the friction ring, while the resting of the spring in relation to the pressure disk is noncritical.

In a further embodiment, the spring is a cup spring disposed axially between the friction ring and the axially outer annular disk and is supported axially in a groove at the outer periphery of the axial extension of the outer toothing. As a result of such a design, the axially outer annular disk of the idling torsion vibration damper is kept axially force free, since the spring is supported in a separate groove of the inner hub.

In a further embodiment the friction device includes an approximately pot-shaped component. In this embodiment, the floor of the pot-shaped component is held against the axially outer annular disk and the walls of the pot-shaped component, which form a cylindrical portion, extend from the floor axially toward the axially inner disk A ring element which is rotationally fixed with the axially inner annular disk is disposed substantially within the space radially within the cylindrical portion. A radially clamped friction element is disposed between outer diameter of the ring element and inner diameter of the cylindrical portion. This design generates relatively high friction forces, since on the one hand the average friction radius is disposed directly radially within the idling springs and, on the other hand, the pot-shaped component may be designed to be very rigid.

In this embodiment, the friction element may be designed as a corrugated spring which is clamped radially from the outside and from the inside, or it is also possible to provide an open clamping ring which rests by self-clamping either radially inwardly or radially outwardly and is driven via its open gap and via the corresponding design of the other component.

A further inventive concept resides in that the parts of the idling friction device are combined into one component and are preassemblable. As a result of the production of the idling friction device in one component, it is possible to check the latter with regard to its function prior to incorporation into the clutch disk and to establish whether the tolerances prescribed for the friction force have been observed. If required, this component may be replaced by another one whose friction force lies within the prescribed range. In this way, the situation may be avoided in which, after the assembly thereof, the complete clutch disk is unusable or has to be completely disassembled and built anew.

In this case, it is particularly advantageous that the component is provided with at least two elements preclamped by spring force axially against one another and is designed to be force-free toward the outside. Such a component is easily assembled, since it merely needs to be inserted into the provided constructional space in the axial direction, as a result of its freedom from force.

In this case, it is provided that into the axial space between the two annular disks there reach rivet heads which are designed for the rotational entainment of at least one other part of the idling device. Thus, for the drive of the idling friction device it is also possible to use already existing components, on the one hand the extended outer toothing of the hub and on the other hand the rivet heads which must in any event be present on the rivets. In this case, the rivet heads may belong to rivets which connect the one annular disk to the corresponding lateral disk of the load torsion oscillation damper, or the rivet heads may also belong to rivets which connect the two lateral disks of the load torsion oscillation damper to the outer hub.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 is a sectional view showing a clutch disk according to the present invention showing the load and idling function devices;

FIG. 2 is a sectional view of the clutch disk as in FIG. 1 showing the load and the idling torsional vibration dampers;

FIG. 3 is a partial view of a toothing between an inner hub and the idling torsion vibration damper of the clutch disk of FIG. 1;

FIG. 6 is a partial sectional view of a friction ring and a spring according to another embodiment of the present invention;

FIG. 6a shows an optional embodiment of the circled portion A of FIG. 6.

DETAILED DESCRIPTION OF THE PRESENTLY PREFERRED EMBODIMENT

Figure 4:
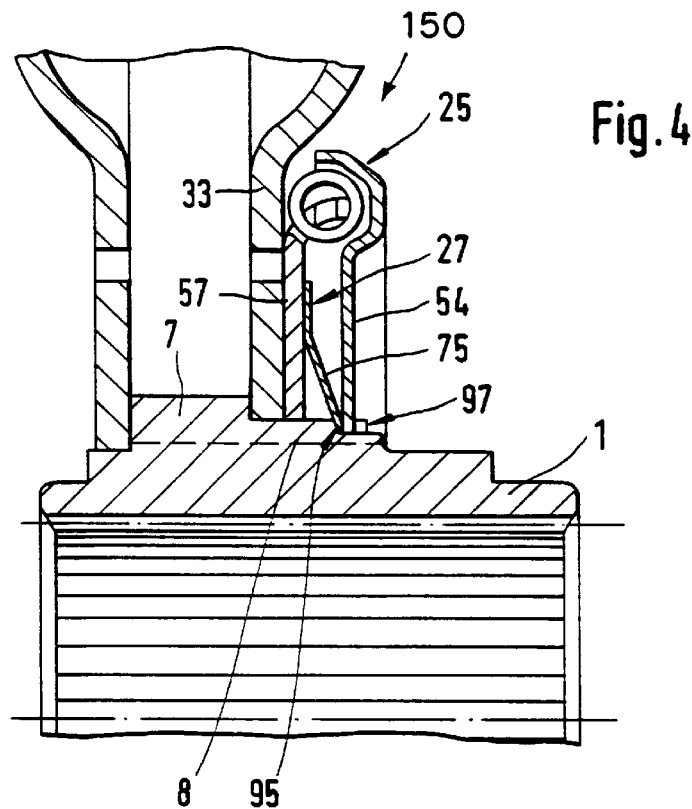
FIG. 4 is a view of an embodiment of a friction device for the idling torsion vibration damper according to the present invention.

Referring to FIGS. 1–3, a clutch disk 150 including an idling friction device 27 according to an embodiment of the present invention is shown. In this embodiment, the clutch disk 150 includes a hub 1 fitted by an inner toothing 3 in rotationally fixed fashion onto a transmission shaft (not shown). The transmission shaft rotates about a common axis of rotation 5. The inner hub 1 also includes an outer toothing 7 into which an outer hub 13 engages by a corresponding inner toothing in rotationally fixed fashion, with play, in the circumferential direction. The amount of play in the circumferential direction determines the range of action of an idling torsion vibration damper 25. Lateral disks 31, 33 are fastened on both axial sides of the outer hub 13 by a plurality of rivets 29 distributed circumferentially proximate the radially inner region of the lateral disks 31, 33. The two lateral disks 31 and 33 are fixedly connected to one another in their radially outer region and kept at a spacing by spacer rivets 35. An intermediate disk 37 positioned axially between the two lateral disks 31, 33 is guided radially on the outer hub 13. The intermediate disk 37 is connected to an entrainer disk 19 that has friction facings 17 at a radially outer side of the spacer rivets 35. A facing elasticity may optionally be provided between the entrainer disk 19 and the friction facings 17. Both the lateral disks 31 and 33 and also the intermediate disk 37 include windows 39, 41, 43 positioned circumferentially between the individual spacer rivets 35. Helical springs 45 are inserted in the windows 39, 41, 43. The lateral disks 31 and 33 with the intermediate disk 37 and the windows 39, 41, 43 with the springs 45 form a load torsion oscillation damper 21. In the embodiment shown, the intermediate disk 37 can be rotated relative to the lateral disks 31 and 33 against the force of the springs 45 in response to a corresponding torsional stressing. A load friction device 23 including, for example, friction rings and at least one axially acting spring may be disposed between the two lateral disks 31 and 33 as well as the intermediate disk 37.

An idling torsion vibration damper 25 is disposed laterally outside the lateral disk 33. The idling torsion damper includes an axially inner annular disk 57 and an axially outer annular disk 59 and a plurality of helical springs 67 which are distributed along the circumference and which are disposed in windows or pockets of the two annular disks 57 and 59. In the embodiment shown, the first annular disk 57 is applied to the outer side of the lateral disk 33 and is connected in rotationally fixed fashion to the latter. The rotationally fixed connection is achieved using rivets 29. A rivet head 69 of one of the rivets 29 shown in FIG. 1 projects axially toward the annular disk 59. However, the rivet head 69 may also be countersunk or a separate connection may be made between annular disk 57 and lateral disk 33.

An idling friction device 27 for idling operation is provided axially between the two annular disks 57 and 59 and radially within the helical springs 67. The idling friction device 27 includes, in a manner corresponding to FIGS. 1–3, a friction ring 73 rotationally fixed and axially displaceable on the inner hub 1. The friction ring 73 is axially stressed by a spring 65 which is disposed between the friction ring 73 and the annular disk 59. The friction ring 73 is stressed toward the outer hub 13 or in the direction of the lateral disk 33 and rests on the rivet heads 69 of the rivets 29, which are circumferentially distributed. For rotationally fixing the friction ring 73 to the inner hub 1, the friction ring 73 includes an inner toothing 77 that engages an axial extension 8 of the outer toothing 7 of the inner hub 1 with reduced outer diameter without play in the circumferential direction onto the extension 8 of the outer toothing 7. As a result of this arrangement, a friction force is generated within the range of effectiveness of the idling torsion oscillation damper 25 during the relative movement between the annular disk 57 and the annular disk 59 that is dependent on the axial preclamping force of the spring 65 and on the coefficient of friction between the friction ring 73 and the rivet heads 69. As a result of the arrangement of the friction ring 73, the annular disk 59 can be kept free from circumferentially acting friction forces of the idling friction device 27. The spring 65 may be designed both as a corrugated spring and as a cup spring, and its radial centering may take place both within a collar of the friction ring 73 (at its outer diameter) and via its inner diameter and via the outer diameter of the extension 8 of the outer toothing 7. In this embodiment, the friction ring 73 is designed to be completely flat on both sides.

The clutch disk 150 operates as follows: During torsional stressing of small magnitude or during the course of idling, the load torsion oscillation damper 21 behaves as a rigid component and a relative movement in the circumferential direction occurs between the lateral disks 31, 33 and the annular disk 57 and one of the inner hub 1 or the annular disk 59. During this relative movement, the idling friction device 27 operates. If a greater torsional stressing occurs, the play between the inner toothing of the outer hub 13 and the outer toothing 7 of the inner hub 1 is used up. When this play is exceeded, the idling torsion oscillation damper 25 is by-passed and the load torsion oscillation damper 21 becomes operative. During operation of the load torsion oscillation damper 21, the driven intermediate disk 37 rotates relative to the two lateral disks 31, 33, and specifically against the force of the helical springs 45 and any possible friction force of the load friction device 23.

FIG. 4 shows a partial section of a clutch disk 150 in which the idling torsion oscillation damper 25 is shown together with the components directly connected to it. The idling friction device 27 of this Figure is of particularly simple type of construction, since it includes only a cup spring 75. This cup spring 75 is rotationally fixedly fitted on the extension 8 of the outer toothing 7 via an inner toothing 77 corresponding to FIG. 3. The spring 75 is axially supported in this region at the axially outer annular disk 59 of the idling torsion oscillation damper 25. On the other side, this spring 75 rests either directly on the axially inner annular disk 57 or—in parallel with FIG. 1—directly on the rivet heads 69. In FIG. 4, the spring 75 is applied by its inner toothing 77 axially toward the axially inner annular disk 57 to a ledge 95 of the extension 8 of the outer toothing 7. It is held in this position by the axially outer annular disk 59 which is likewise fitted by a corresponding inner toothing in rotationally fixed fashion onto the extension 8 and is held, for example, by a stop 97. In place of the stop 97, a different mode of securing may of course also be implemented, such as a weld seam.

Figure 5:
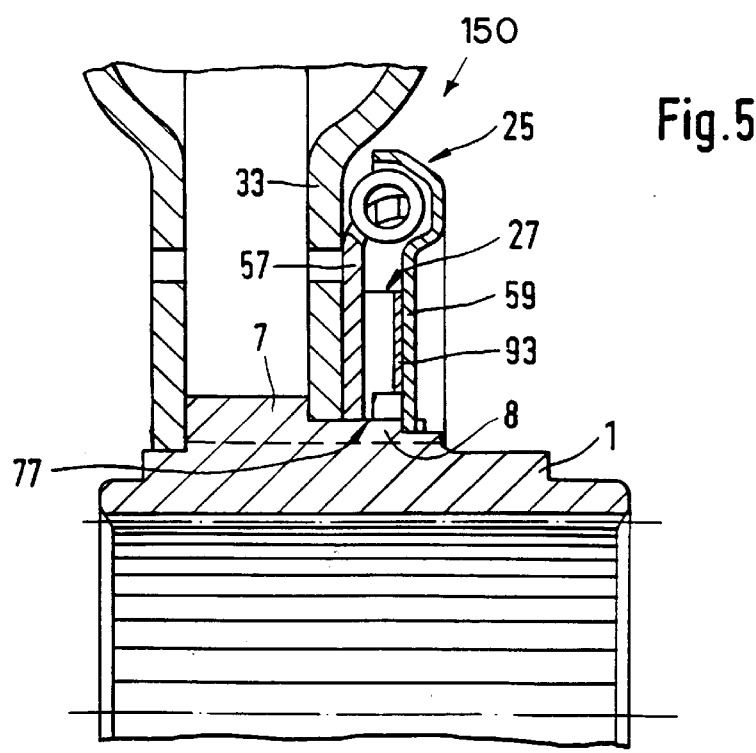
FIG. 5 is a partial sectional view of a friction device for the idling torsion vibration damper according to another embodiment of the present invention in the form of a corrugated spring.

In FIG. 5, a corrugated spring 93 is used for the force generation by the idling friction device 27 instead of the cup spring 75. The corrugated spring 93 is inserted, with pre-stress, axially between the two annular disks 57 and 59. The corrugated spring 93 extends in a radially inward direction and is provided with an inner toothing 77 which engages in rotationally fixed fashion into the outer toothing 7 in the region of the axial extension 8. The corrugated spring 93 rests on the one hand on an inner wall of the annular disk 59 and, on the other hand, on an inner wall of the annular disk 57 or—in a manner corresponding to FIG. 1—directly on the rivet heads 69.

In the case of the arrangement of an idling friction device 27 according to FIG. 6, a spring in the form of a cup spring 65 is disposed to be circumferentially free from force. A friction ring 91 is fitted between the cup spring 65 and the annular disk 57. A radially inner circumference of the friction ring 91 is fitted via an inner toothing in rotationally fixed fashion onto the axial extension 8 of the outer toothing 7 of the inner hub 1. The spring 65 thus merely needs to exert an axial force and it is supported on the one hand on the fiction ring 91 and, on the other hand, on the annular disk 59. This spring 65 may still engage with radially inwardly pointing tongues into the axial extension 8 of the outer toothing 7, but a torsional stressing in this region is not intended. In this case, the centering of this spring 65 takes place on the inner hub 1. It is also inferred from FIG. 6 that the rivets 29 are provided with countersunk rivet heads 71, so that the friction ring 91 rests on a surface parallel to the inner walling of the annular disk 57.

In an embodiment corresponding to the representation of FIG. 6, the cup spring 65 rests only in circular fashion on the friction ring 91. The friction ring 91 is produced from a reinforced plastic material to better facilitate the introduction and distribution of the force. However, reinforced—such, for example, as glass-fiber reinforced plastic material—has certain disadvantages with respect to its constancy of frictional force. Another possible embodiment shown in FIG. 6a includes arranging a pressure disk 151 which is produced, for example, from metal and which is likewise fitted in rotationally fixed fashion on the axial extension 8 instead of the friction ring 91. In such a design, a friction ring 91 can then be inserted between the pressure disk 151 and the annular disk 57, which friction ring consists of a nonreinforced plastic material and its constancy of coefficient of friction is particularly good. Using this arrangement, the pre-stress force of the cup spring 65 is uniformly transmitted to a suitable friction material.

Figure 7:
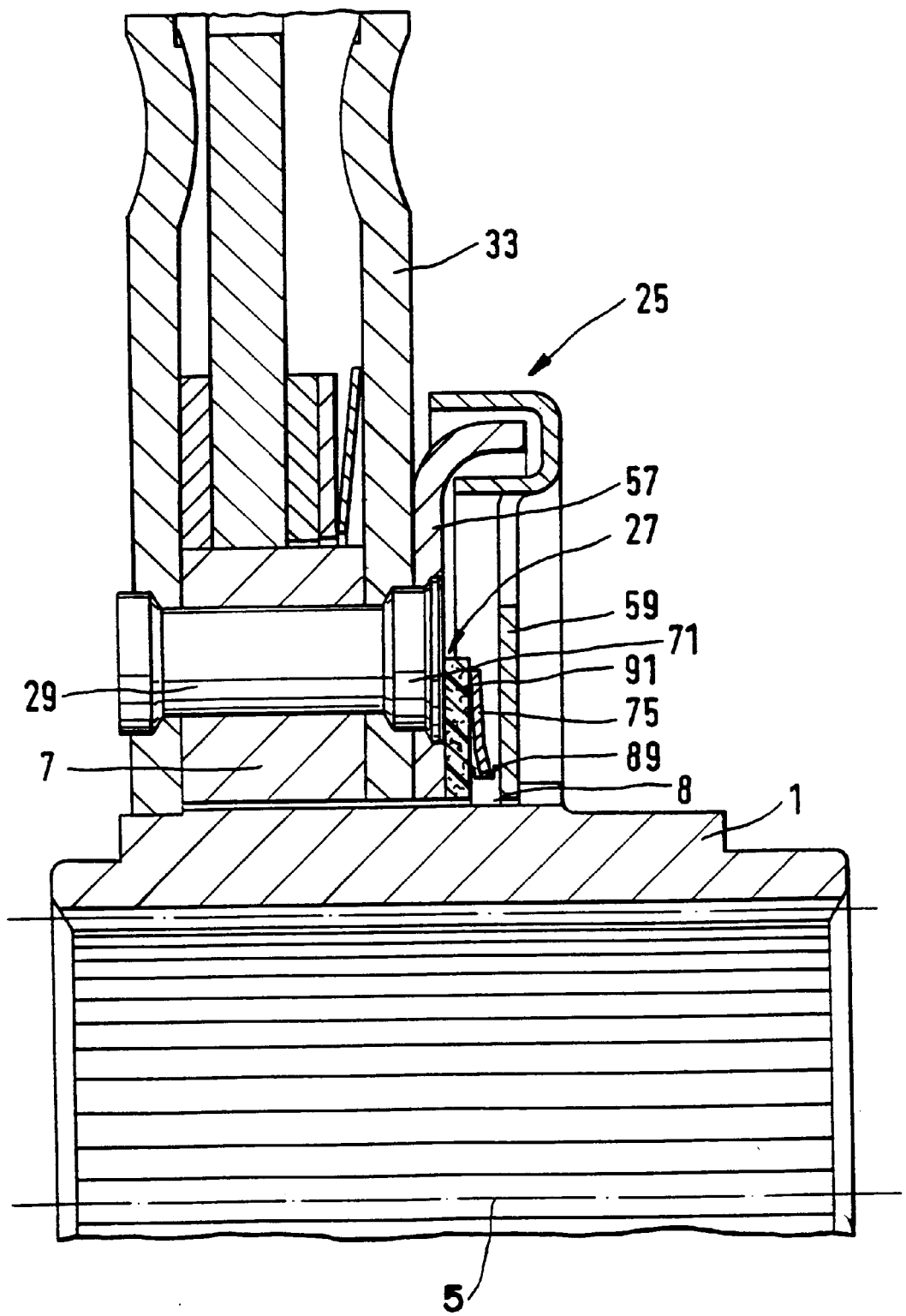
FIG. 7 is a partial sectional view of an idling friction device according to another embodiment of the present invention with a separately axially supported cup spring.

In the case of the design shown in FIG. 7, the cup spring 75 is arranged for the frictional force generation and the function ring 91 which is again rotationally fixedly fitted via its inner toothing onto the axial extension 8 of the outer toothing 7 of the inner hub 1. In this embodiment, the spring 75 is supported in the region of its outer diameter on the friction ring 91 and in the region of its inner diameter in a groove 89 which is introduced into the extension 8 of the outer toothing 7. As a result of this arrangement, the annular disk 59 of the idling torsion oscillation damper 25 is axially free from force with respect to the idling friction device 27. Therefore, the axial securing between annular disk 59 and inner hub 1 may be kept simpler.

Figure 8:
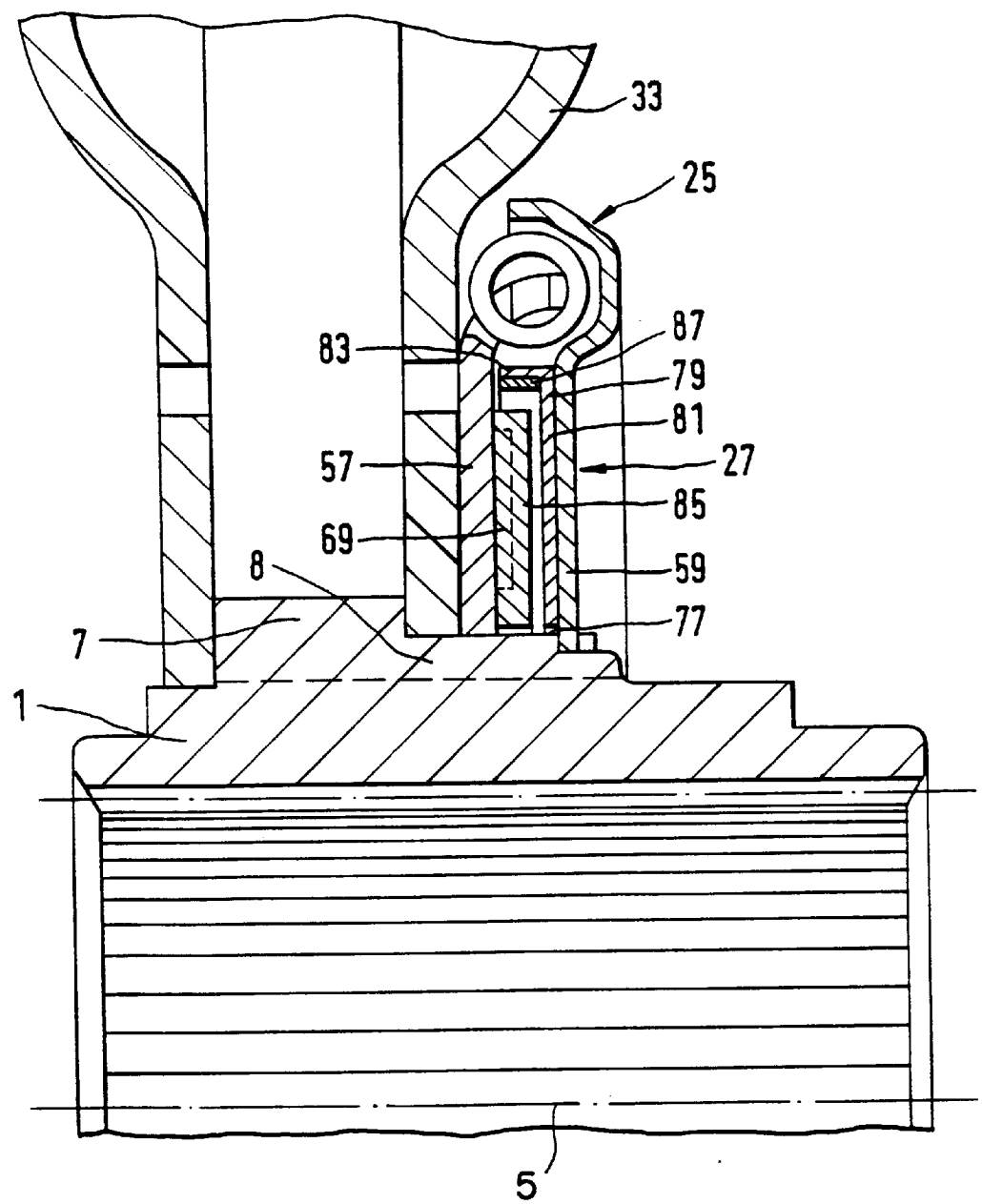
FIG. 8 is a partial sectional view of an idling friction device according to another embodiment of the present invention with a radially clamped spring.

FIG. 8 shows—with a substantially identical set of features—a somewhat different arrangement of the idling friction device 27 including a pot-shaped component 79. A floor 81 of the pot-shaped component 79 rests on the inner wall of the axially outer annular disk 59 of the idling torsion oscillation damper 25. The pot-shaped component 79 also has an inner toothing 77 arranged rotationally fixed onto the axial extension 8 of the outer toothing 7 of the inner hub 1. Toward the axially outer side outside of the idling torsion vibration damper, the pot-shaped component 79 is axially held by the axially outer annular disk 59. The walls of the pot-shaped component 79 include a cylindrical portion 83. A ring element 85 is positioned radially within the cylindrical portion 83. The ring element 85 is rotationally fixed with the axially inner annular disk 57 or the lateral disk 33. This rotational connection is created by the rivet heads 69. However, another type of rotational connection may also be used. A spring 87 is arranged in an annular space between the outer diameter of the ring element 85 and the inner diameter of the cylindrical portion 83 of the pot-shaped component 79. The spring 87 may, for example, be designed as a corrugated spring such that, seen in the circumferential direction, it rests alternately on the inner diameter of the cylindrical portion 83 and on the outer diameter of the ring element 85 with radial prestress and thus generates a friction force in relation to both parts. However, the spring 87 may also be designed as a circumferentially open annular spring which is clamped by its radial self-clamping either on the outer diameter of the ring element 85 or in the inner diameter of the cylindrical portion 83. The entrainment of the spring 87 then occurs by a component which engages into the circumferentially open position of this annular spring. As the force acts for the frictional force generation in the radial direction, this idling friction device 27 is also axially force-free.

Figure 9:
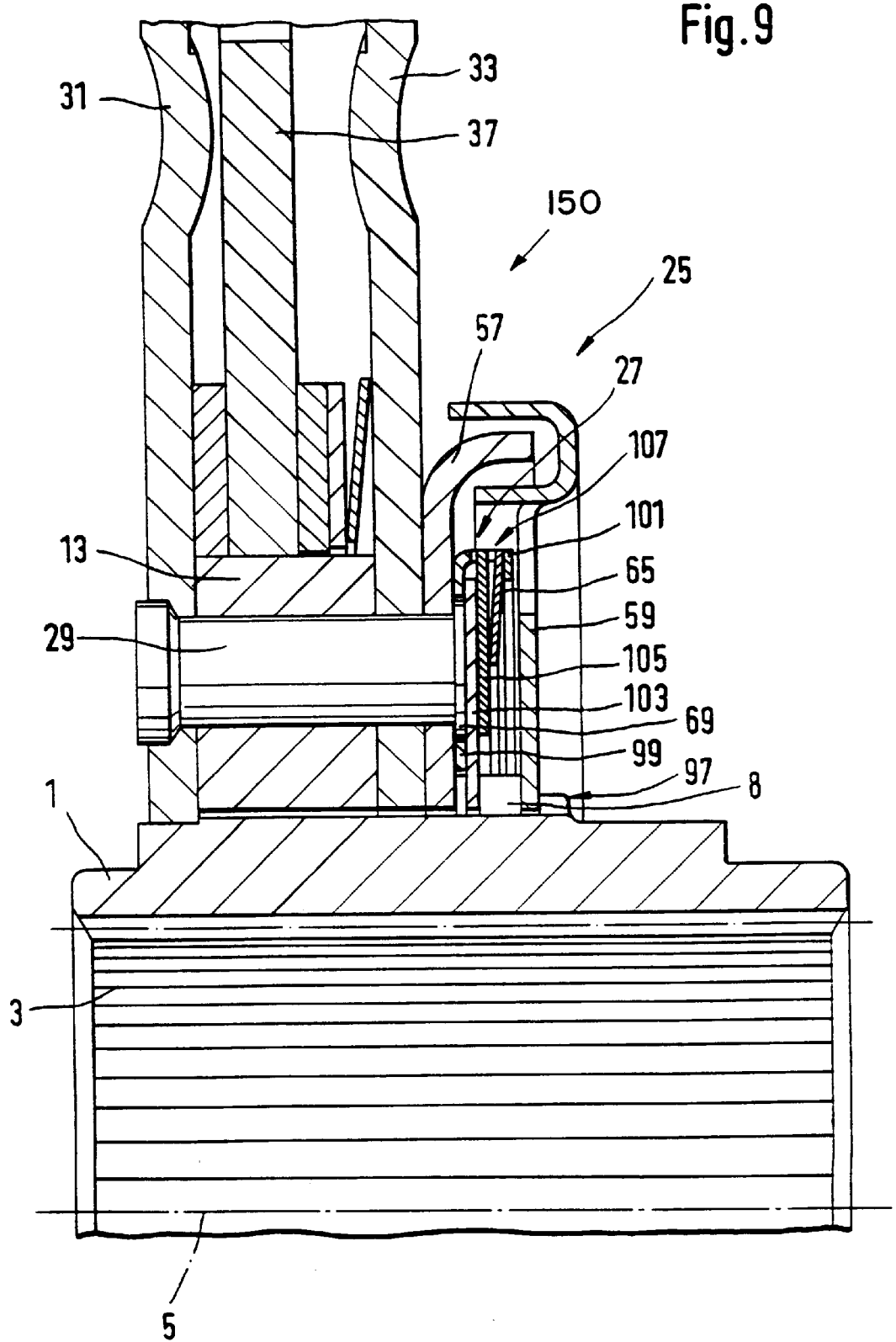
FIG. 9 is a partial sectional view of yet another embodiment of an idling friction device as a separately assemblable component.

FIG. 9 shows a partial section of a clutch disk which essentially corresponds to the construction corresponding to FIGS. 1 and 2. In contrast to FIGS. 1 and 2, however, the idling friction device 27 of FIG. 9 is designed as a fully preassemblable, independent component. Therefore, all components of the idling friction device 27 may be preassembled before the final overall assembly of the clutch disk 150 and may be checked for their precise function prior to incorporation. The idling friction device 27 is inserted axially with play between the two annular disks 57 and 59 of the idling torsion oscillation damper 25, and it is rotationally fixedly connected by one part without play to the axial extension 8 of the outer toothing of the inner hub 1 and by another part to the rivet head 69 of the respective rivet 29, which, as in the present case, connects the lateral disks 31 and 33 of the load torsion oscillation damper to the outer hub 13. Alternatively, rivet heads of rivets which merely connect the annular disk 57 to the pertinent lateral disk 33 may be used.

In embodiment shown in FIG. 9, the idling friction device 27 includes a cavity sheet 99 which has axially extending noses 107 in its radially outer region. A friction ring 103 is rotationally fixed to the axial extension 8 of the outer toothing. A radially outer region of an intermediate ring 105 is rotationally fixed to the noses 107. A spring 65 is axially supported at a support ring 101, which is fixedly connected to the noses 107 to generate an axial force. The spring 65 is advantageously radially fixed at its outer periphery by the noses 107. The cavity sheet 99 forms, in conjunction with the support ring 101, an axially sealed off space in which an axial force is generated by spring 65 for the frictional abutment of the friction ring 103 on the intermediate ring 105. In this case, the support ring 101 may also be formed from radially inwardly bent-over ends of the noses 107. The cavity sheet 99 is provided with a plurality of openings into which the rivet heads 69 penetrate. The function of the friction device 27 arises from the fact that the cavity sheet 99 is circumferentially driven via the rivet heads 69 by the lateral disks 31 and 33, while the inner hub 1—conceived as a stationary component—circumferentially retains the friction ring 103 via the axial extension 8 of the outer toothing 7. In this case, for the precise placement of the friction surfaces of friction ring 103 and intermediate ring 105 the latter is held in rotationally fixed but axially displaceable by the noses 107 of the cavity sheet 99. As a result of this arrangement, the spring 65 is free from torsional stressing. It is of course conceivable that the structure of the idling friction device may be designed more simply and including, at the very least, an input part driven by the rivet heads 69, an output part rotationally fixedly fitted on the axial extension 8, and a spring. In the case of such an arrangement, the position at which the friction is generated is not precisely predictable.

Irrespective of the design of the friction device, the latter is preassemblable as a component outside the clutch disk and may be checked before installation for its function. The overall assembly likewise takes place in a simple manner, since the friction ring 103 merely needs to be pushed onto the axial extension 8 of the outer toothing 7 and the openings in the cavity sheet 99 need to be pushed over the rivet heads 69. As a result of the axial play between the friction device 27 and the two annular disks 57 and 59 in the final condition of the assembly of the clutch disk, the fitting of the annular disk 59 and of its stop 97 is axially force-free and nonproblematic.

We claim:

1. A clutch disk for a friction clutch, comprising:
   an inner hub having an inner toothing and an outer toothing;
   an outer hub enclosing said inner hub and engaging said outer toothing of said inner hub with a predetermined amount of rotational play;
   an entrainer disk having clutch friction facings rotatably connected to said outer hub through a limited angle of rotation;
   a load torsion vibration damper having first and second damper parts rotatable relative to one another and a plurality of load springs connected between said first and second load damper parts for rotationally resiliently supporting said first load damper part with respect to said second load damper part, said first load damper part comprising two lateral disks axially spaced from one another and connected to one of said outer hub and said entrainer disk, and said second load damper part comprising an intermediate disk arranged between said lateral disks and connected to the other of said outer hub and said entrainer disk;
   an idling torsion vibration damper axially laterally arranged on a side of one of said lateral disks facing away from the intermediate disk having first and second idling damper parts rotatable relative to one another and a plurality of idling springs connected between said first and second idling damper parts for rotationally resiliently supporting said first idling damper part with respect to said second idling damper part, said first idling damper part comprising an axially inner annular disk arranged adjacent said one of said lateral disks and connected to one of said outer hub and said inner hub, and said second idling damper part comprising an axially outer annular disk connected to the other of said outer hub and said inner hub, said outer toothing of said inner hub having an axial extension extending from said one of said lateral disks to said axially outer annular disk; and
   an idling friction device operatively connected between said first and second idling damper parts radially inside of said idling springs, wherein at least one part of said idling friction device comprises a friction ring having an inner toothing rotatably fixedly connected with said axial extension of said outer toothing of said inner hub and a cup spring disposed axially between said friction ring and said axially outer annular disk, said cup spring being axially supported in a groove at an outer periphery of said axial extension of said outer toothing of said inner hub and operatively arranged for urging said friction ring toward said one of said lateral disks.

2. The clutch disk of claim 1, wherein said idling friction device comprises a preassemblable component.

3. The clutch disk of claim 2, wherein said component comprises at least two elements preclamped by a spring force axially against one another and is designed to be force-free toward an axially outer side.

4. The clutch disk of claim 3, further comprising rivet head of rivets penetrating into an axial space between said first and second idling damper parts operatively arranged for rotationally entraining at least one other part of said idling friction device.

5. The clutch disk of claim 4, wherein said rivets connect said axially inner annular disk to said one of said lateral disks of said load torsion vibration damper.

6. The clutch disk of claim 4, wherein said rivets connect said lateral disks of said load torsion vibration damper to said outer hub.

7. A clutch disk for a friction clutch, comprising:

an inner hub having an inner toothing and an outer toothing;

an outer hub enclosing said inner hub and engaging said outer toothing of said inner hub with a predetermined amount of rotational play;

an entrainer disk having clutch friction facings rotatably connected to said outer hub through a limited angle of rotation;

a load torsion vibration damper having first and second damper parts rotatable relative to one another and a plurality of load springs connected between said first and second load damper parts for rotationally resiliently supporting said first load damper part with respect to said second load damper part, said first load damper part comprising two lateral disks axially spaced from one another and connected to one of said outer hub and said entrainer disk, and said second load damper part comprising an intermediate disk arranged between said lateral disks and connected to the other of said outer hub and said entrainer disk;

an idling torsion vibration damper axially laterally arranged on a side of one of said lateral disks facing away from the intermediate disk having first and second idling damper parts rotatable relative to one another and a plurality of idling springs connected between said first and second idling damper parts for rotationally resiliently supporting said first idling damper part with respect to said second idling damper part, said first idling damper part comprising an axially inner annular disk arranged adjacent said one of said lateral disks and connected to one of said outer hub and said inner hub, and said second idling damper part comprising an axially outer annular disk connected to the other of said outer hub and said inner hub, said outer toothing of said inner hub having an axial extension extending from said one of said lateral disks to said axially outer annular disk; and an idling friction device operatively connected between said first and second idling damper parts radially inside of said idling springs including a pot-shaped component having an inner toothing rotatably fixedly connected with said axial extension of said outer toothing of said inner hub, said pot-shaped component further having a floor and a wall, said wall comprising a cylindrical portion, said floor being arranged adjacent said axially outer annular disk and said cylindrical portion extending axially toward said axially inner annular disk, said idling friction device further comprising a ring element rotatably fixedly disposed with said axially inner annular disk radially inside of said cylindrical portion and a radially braced friction element comprising an open clamping ring disposed between an outer diameter of said ring element and an inner diameter of said cylindrical portion, said friction element resting by self-clamping on one of said cylindrical portion and driven by the other of said cylindrical portion and said ring element.

8. The clutch disk of claim 7, wherein said idling friction device comprises a preassemblable component.

9. The clutch disk of claim 8, wherein said component comprises at least two elements preclamped by a spring force axially against one another and is designed to be force-free toward an axially outer side.

10. The clutch disk of claim 9, further comprising rivet head of rivets penetrating into an axial space between said first and second idling damper parts operatively arranged for rotationally entraining at least one other part of said idling friction device.

11. The clutch disk of claim 10, wherein said rivets connect said axially inner annular disk to said one of said lateral disks of said load torsion vibration damper.

12. The clutch disk of claim 10, wherein said rivets connect said lateral disks of said load torsion vibration damper to said outer hub.

13. A clutch disk for a friction clutch, comprising:

an inner hub having an inner toothing and an outer toothing;

an outer hub enclosing said inner hub and engaging said outer toothing of said inner hub with a predetermined amount of rotational play;

an entrainer disk having clutch friction facings rotatably connected to said outer hub through a limited angle of rotation;

a load torsion vibration damper having first and second damper parts rotatable relative to one another and a plurality of load springs connected between said first and second load damper parts for rotationally resiliently supporting said first load damper part with respect to said second load damper part, said first load damper part comprising two lateral disks axially spaced from one another and connected to one of said outer hub and said entrainer disk, and said second load damper part comprising an intermediate disk arranged between said lateral disks and connected to the other of said outer hub and said entrainer disk;

an idling torsion vibration damper axially laterally arranged on a side of one of said lateral disks facing away from the intermediate disk having first and second idling damper parts rotatable relative to one another and a plurality of idling springs connected between said first and second idling damper parts for rotationally resiliently supporting said first idling damper part with respect to said second idling damper part, said first idling damper part comprising an axially inner annular disk arranged adjacent said one of said lateral disks and connected to one of said outer hub and said inner hub, and said second idling damper part comprising an axially outer annular disk connected to the other of said outer hub and said inner hub, said outer toothing of said inner hub having an axial extension extending from said one of said lateral disks to said axially outer annular disk; and an idling friction device operatively connected between said first and second idling damper parts radially inside of said idling springs including a pot-shaped element having an inner toothing rotatably fixedly connected with said axial extension of said outer toothing of said inner hub, said pot-shaped component having a floor and a wall, said wall comprising a cylindrical portion, said floor being arranged adjacent said axially outer annular disk and said cylindrical portion extending axially toward said axially inner annular disk, and said idling friction device further comprising a ring element rotatably fixedly disposed with said axially inner annular disk radially inside of said cylindrical portion and a corrugated spring disposed between an outer diameter of said ring element and an inner diameter of said cylindrical portion.

14. The clutch disk of claim 13, wherein said idling friction device comprises a preassemblable component.

15. The clutch disk of claim 14, wherein said component comprises at least two elements preclamped by a spring force axially against one another and is designed to be force-free toward an axially outer side.

16. The clutch disk of claim 15, further comprising rivet head of rivets penetrating into an axial space between said first and second idling damper parts operatively arranged for rotationally entraining at least one other part of said idling friction device.

17. The clutch disk of claim 16, wherein said rivets connect said axially inner annular disk to said one of said lateral disks of said load torsion vibration damper.

18. The clutch disk of claim 16, wherein said rivets connect said lateral disks of said load torsion vibration damper to said outer hub.

* * * * *